United States Patent
Bird et al.

(10) Patent No.: US 7,461,152 B2
(45) Date of Patent: Dec. 2, 2008

(54) APPARATUS AND METHOD FOR SHARING A SHARED RESOURCE ACROSS LOGICAL PARTITIONS OR SYSTEMS

(75) Inventors: John Joseph Bird, Rochester, MN (US); Bob Richard Cernohous, Rochester, MN (US); Christopher Thomas Gloe, Rochester, MN (US); Franklin A. Gruber, Vestal, NY (US); Scott Jon Prunty, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 10/815,235

(22) Filed: Mar. 31, 2004

(65) Prior Publication Data

US 2005/0240648 A1  Oct. 27, 2005

(51) Int. Cl.
*G06F 15/16* (2006.01)
(52) U.S. Cl. .............. 709/227; 370/331; 370/338; 370/401
(58) Field of Classification Search ............... 709/223, 709/220; 370/338, 356
See application file for complete search history.

(56) References Cited

U.S. PATENT DOCUMENTS 7,085,827 B2* 8/2006 Ishizaki et al. ............. 709/223
7,225,259 B2* 5/2007 Ho et al. .................... 709/227
7,339,908 B2* 3/2008 Uhlik et al. ................ 370/331

OTHER PUBLICATIONS

W. Townsley et al., "RFC 2661 (RFC2661)," http://www.faqs.org/rfcs/rfc2661.html, printed Feb. 13, 2004; pp. 1-60.

* cited by examiner

*Primary Examiner*—Dustin Nguyen
(74) *Attorney, Agent, or Firm*—Martin & Associates, LLC; Derek P. Martin

(57) ABSTRACT

An apparatus and method for sharing a resource (such as a modem or virtual private network) allow virtualizing the shared resource in a simple and efficient manner that allows both accepting and initiating virtual or physical connections through the shared resource across logical partitions or systems. An L2TP tunnel is established between the server that owns the shared resource and the client that desires to use the shared resource. Messages are defined that allow the client to initiate an outgoing connection through the shared resource, and that allow the client to accept an incoming connection received from the shared resource. Once the connection is made, the client and ultimate destination communicate through the shared resource via point-to-point communications.

7 Claims, 7 Drawing Sheets

| Static Config | | |
|---|---|---|
| Destination IP Address | Phone # | Authentication Info |
| 10.1.1.88 | 914-555-2942 | j_brown, brownyhi |
| ... | ... | ... |
| 10.1.1.89 | 862-555-4629 | e_smith, smythe |

FIG. 4   Prior Art

| Static Config | |
|---|---|
| Destination IP Address | Modem Gateway IP Address |
| 10.1.1.88 | 10.1.1.73 |

FIG. 5   Prior Art

APPARATUS AND METHOD FOR SHARING A SHARED RESOURCE ACROSS LOGICAL PARTITIONS OR SYSTEMS

BACKGROUND OF THE INVENTION

1. Technical Field

This invention generally relates to data processing, and more specifically relates to the sharing of resources between logical partitions in a logically partitioned computer system or between physical computer systems.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The iSeries computer system developed by IBM is an example of a computer system that supports logical partitioning. If logical partitioning on an iSeries computer system is desired, partition manager code (referred to as a "hypervisor" in iSeries terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources between the logical partitions. For example, a computer system with a single CPU could have two logical partitions defined, with 50% of the CPU allocated to each logical partition, with 33% of the memory allocated to the first logical partition and 67% of the memory allocated to the second logical partition, and with two different I/O slots allocated to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

Logical partitions typically communicate using an internal virtual local area network (VLAN). This VLAN implementation simplifies the migration of multiple computer systems into a single computer system with multiple logical partitions. Where the separate computer systems used to communicate over LAN connections, the logical partitions may now communicate in similar manner over their internal VLAN connections.

One type of resource that may be shared between logical partitions is a modem. Because modem operations may be relatively infrequent, a single modem may be able to service many different logical partitions if it may be efficiently shared between the logical partitions. In one known system for sharing modems for outgoing calls, static configuration data must be setup on both the modem server and each client. This configuration does not allow the client that wants to use the modem to directly control the modem. Instead, the modem is controlled by the modem server, and use of the modem is limited according to the predefined static configuration on both the modem server and the client. Without a way to share a resource such as a modem between logical partitions or between physical computer systems in a more efficient manner, the computer industry will continue to suffer from inefficient ways of sharing resources across multiple logical partitions or systems.

DISCLOSURE OF INVENTION

An apparatus and method for sharing a resource (such as a modem or virtual private network) allow virtualizing the shared resource in a simple and efficient manner that allows both accepting and initiating virtual or physical connections through the shared resource across logical partitions or systems. An L2TP tunnel is established between the server that owns the shared resource and the client that desires to use the shared resource. Messages are defined that allow the client to initiate an outgoing connection through the shared resource, and that allow the client to accept an incoming connection received from the shared resource. Once the connection is made, the client and ultimate destination communicate through the shared resource via point-to-point communications.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 4 is a block diagram of prior art static configuration information that is setup on the modem server in step 210 of FIG. 2;

FIG. 5 is a block diagram of prior art static configuration information that is setup on the modem client in step 220 of FIG. 2;

BEST MODE FOR CARRYING OUT THE INVENTION

According to preferred embodiments of the present invention, a shared resource may be shared across logical partitions or physical systems in a manner that allows a client to have control over the shared resource. A communications tunnel is built between the client and the resource server. Messages are defined in the communication protocol for the tunnel that allow establishing an outgoing connection from the client through the shared resource. In addition, user-defined extensions for the communication protocol are provided that allow establishing an incoming connection received from the shared resource to the client. Once a connection is made, the client and ultimate destination communicate through the shared resource via point-to-point communication.

Figure 1:
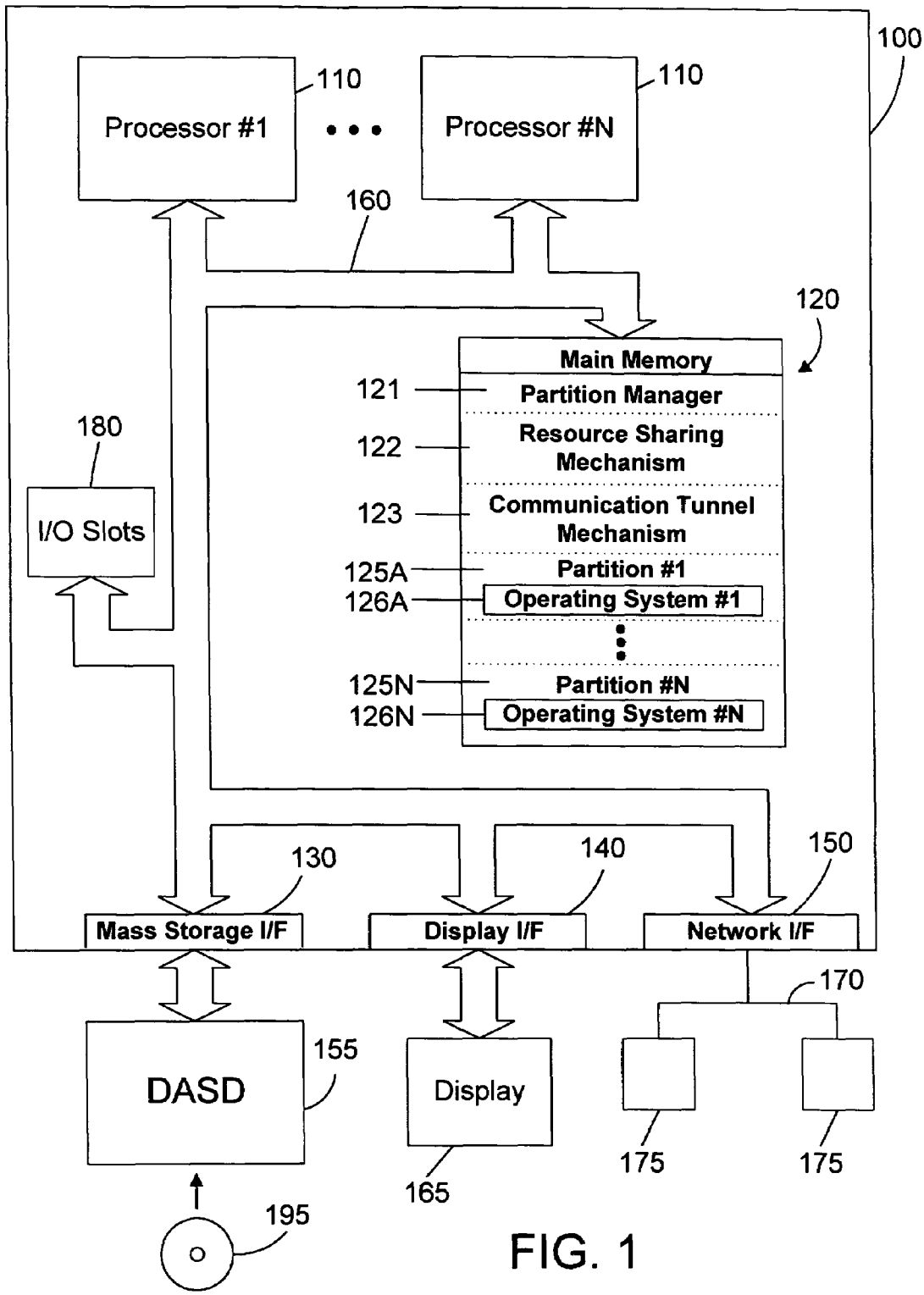
FIG. 1 is a block diagram of a computer apparatus that supports logical partitioning and resource sharing in accordance with the preferred embodiments.

Referring to FIG. 1, a computer system 100 is an enhanced IBM eServer iSeries computer system, and represents one suitable type of computer system that supports logical partitioning and resource sharing in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a main memory 120, a mass storage interface 130, a display interface 140, a network interface 150, and a plurality of I/O slots 180. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195. Note that mass storage interface 130, display interface 140, and network interface 150 may actually be implemented in adapters coupled to I/O slots 180. An I/O adapter is one suitable network interface 150 that may be implemented in an external card that is plugged into one of the I/O slots 180. In addition, other I/O devices such as modems can be plugged into one of the I/O slots 180.

Main memory 120 contains a partition manager 121, a resource sharing mechanism 122, a communication tunnel mechanism 123, and N logical partitions 125, shown in FIG. 1 as logical partitions 125A through 125N. Partition manager 121 preferably creates these N logical partitions 125. Each logical partition 125 preferably includes a corresponding operating system 126, shown in FIG. 1 as operating systems 126A through 126N.

The resource sharing mechanism 122 efficiently shares a resource (such as a modem) between logical partitions or between physical computer systems. While the resource sharing mechanism 122 is shown in FIG. 1 to reside in main memory 120, one skilled in the art will appreciate that resource sharing mechanism 122 preferably includes different pieces that reside within the logical partitions 125 and within the partition manager 121, and that sharing of a shared resource of the preferred embodiments occurs through cooperation of these different pieces, as shown in FIGS. 6-10, which are discussed in more detail below. Resource sharing mechanism 122 uses a communication tunnel mechanism 123 to establish a direct communication channel (or tunnel) between a resource server and its clients. One suitable example of a communication tunnel mechanism 123 in accordance with the preferred embodiments is an L2TP tunnel mechanism that has vendor-specific (i.e., user-defined) extensions, as discussed in more detail below.

Operating system 126 is a multitasking operating system, such as OS/400, AIX, or Linux; however, those skilled in the art will appreciate that the spirit and scope of the present invention is not limited to any one operating system. Any suitable operating system can be used. Operating system 126 is a sophisticated program that contains low-level code to manage the resources of computer system 100. Some of these resources are processor 110, main memory 120, mass storage interface 130, display interface 140, network interface 150, system bus 160, and I/O slots 180. The operating system 126 in each partition may be the same as the operating system in other partitions, or may be a completely different operating system. Thus, one partition can run the OS/400 operating system, while a different partition can run another instance of OS/400, possibly a different release, or with different environment settings (e.g., time zone or language). The operating systems in the logical partitions could even be different than OS/400, provided it is compatible with the hardware (such as AIX or Linux). In this manner the logical partitions can provide completely different computing environments on the same physical computer system.

The partitions 125A-125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources, such as I/O slots 180 (and I/O adapters, which may reside in I/O slots 180). Thus, one partition could be defined to include two processors and a portion of memory 120, along with one or more I/O processors that can provide the functions of mass storage interface 130, display interface 140, network interface 150, or interfaces to I/O adapters or other devices (such as modems) plugged into I/O slots 180. Another partition could then be defined to include three other processors, a different portion of memory 120, and one or more I/O processors. The partitions are shown in FIG. 1 to symbolically represent logical partitions, which would include system resources outside of memory 120 within computer system 100. Note also that the partition manager 121 preferably resides in memory and hardware separate from the logical partitions and includes facilities and mechanisms that are not directly available to the logical partitions.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while partition manager 121, resource sharing mechanism 122, communication tunnel mechanism 123, and the partitions 125A-125N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the partition manager 121, which initializes the operating systems in the logical partitions.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 2:
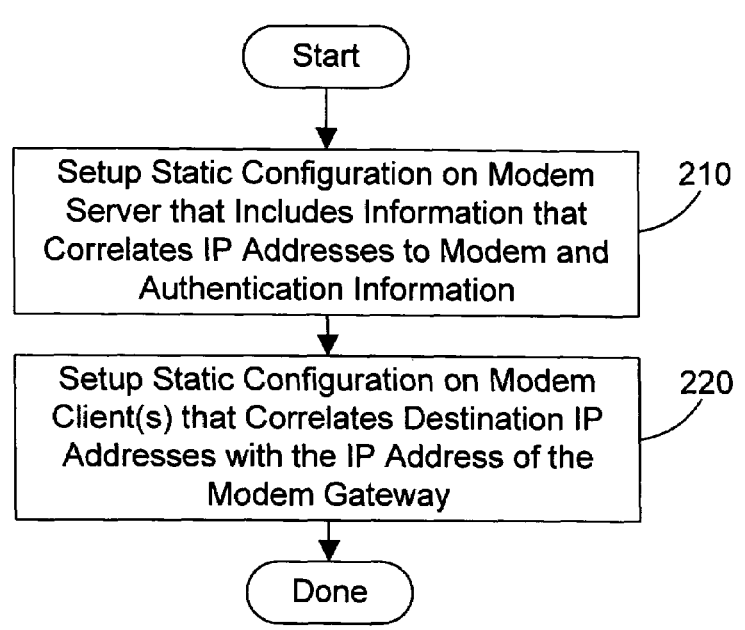
FIG. 2 is a flow diagram of a prior art method for configuring a modem server and a modem client to share a modem in the modem server.

A detailed discussion of prior art modem sharing is now presented, which provides a context for discussing the resource sharing in accordance with the preferred embodiments. Referring to FIG. 2, a method 200 represents steps that are taken in the prior art to prepare for sharing a modem across logical partitions or systems, as shown in system 300 in FIG. 3. First, static configuration data is setup on the logical partition or system that owns the modem, referred to herein as the "modem server" (step 210). This static configuration information correlates certain IP addresses to corresponding modem and authentication information. Next, static configuration information is setup on each logical partition or system (modem client) that wants to share the modem (step 220). This configuration information correlates destination IP addresses with the IP address of the modem gateway.

Figure 3:
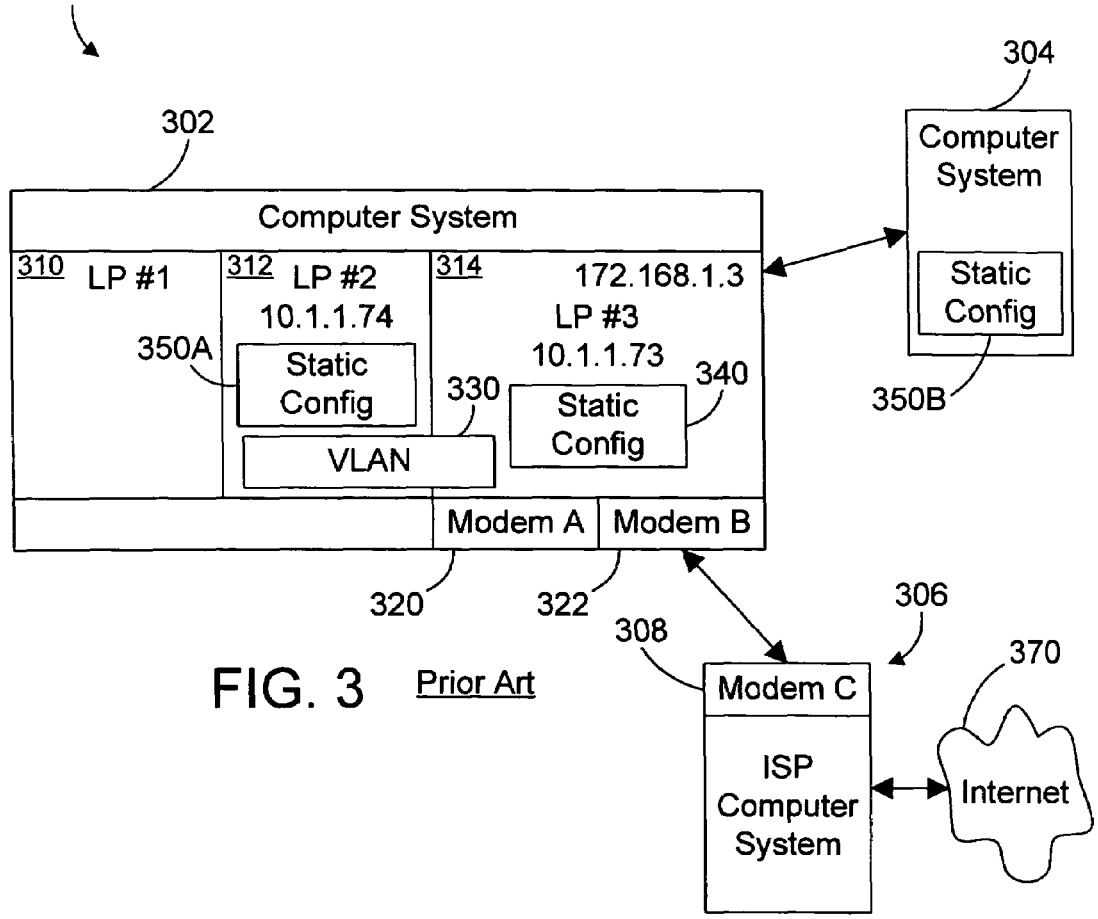
FIG. 3 is a block diagram of a prior art networked computer system that allows sharing a modem between logical partitions or between computer systems for outgoing calls.

A prior art system 300 is shown in FIG. 3, and includes a first computer system 302, a second computer system 304, and a third computer system 306. Computer system 302 is a computer system that includes three logical partitions 310, 312 and 314. The logical partition 314 includes two modems 320 and 322. We assume that the logical partitions 312 and 314 may communicate with each other via a virtual LAN (VLAN) 330. Logical partition 312 has an IP address of 10.1.1.74, while logical partition 314 has an IP address of 10.1.1.73. The logical partition 314 is the "modem server" in this specific example, because it owns (i.e., controls access to) the modems 320 and 322. There are two potential clients in the configuration shown in FIG. 3. The logical partition 312 may be a client that shares the modems 320 and 322, and the second computer system 304 may also be a client that shares the modems 320 and 322. We assume for this specific example that modem 322 is made available for sharing. Step 210 in FIG. 2 sets up the static configuration information 340 in the modem server (logical partition 314). Step 220 in FIG. 2 then sets up the static configuration information in the two clients. Thus, static configuration information 350A is setup on the logical partition 312, while static configuration information 350B is setup on the second computer system 304.

An example of prior art static configuration information for a modem server is shown in table 400 of FIG. 4. In this simple example, an IP address has a corresponding phone number and authentication information. Thus, an entry 410 correlates an IP address of 10.1.1.88 to a phone number of 914-555-2942 and authentication information that includes a username of j_brown and a password of brownyhi. In similar fashion, an entry 420 correlates an IP address of 10.1.1.89 to a phone number of 862-555-4629 and authentication information that includes a username of e_smith and a password of smythe. The static configuration information in this simple example is used to correlate a phone number and corresponding authentication information to an IP address. When this IP address is accessed, the modem server knows the access corresponds to a request to dial the phone number and to use the corresponding authentication information to authenticate to the modem that answers the call. Thus, if the client writes to IP address 10.1.1.88, the modem server knows it needs to call 914-555-2942 and establish a connection using the corresponding authentication information. We assume this telephone number corresponds to an internet service provider (ISP) that has a computer system 306 coupled to the Internet 370, where the computer system 306 includes a modem 308 that answers the incoming call. When modem 308 answers, modem 322 sends the authentication information in the static configuration information 340 that corresponds to that phone number, thereby authenticating the user to the ISP computer system 306. At this point the client in logical partition 312 may access the Internet 370 by simply writing data to and reading data from the IP address 10.1.1.88 that corresponds to the shared modem. Each time the modem server 314 receives data for IP address 10.1.1.88 from the client in the logical partition 312, it sends the data through modem 322 to the ISP computer system 306.

An example of static configuration information for a client is shown in FIG. 5. In this simple example, an entry 510 correlates a destination IP address of 10.1.1.88 to an IP address of the modem gateway, namely 10.1.1.73. Thus, when the client needs to communicate via modem, it simply writes the data to be communicated to IP address 10.1.1.88. When the modem server sees the write of the data by the client to this IP address, which is in its own static configuration information, the modem server will dial the corresponding phone number and make a connection using the corresponding authentication information. The prior art thus provides a way for a client on a different logical partition or system to share a modem for outgoing calls, so long as the needed information is setup in the static configuration information. This approach is very inflexible, and does not allow the client to control the modem. For this reason, this prior art modem sharing method is not in widespread use. In addition, the prior art modem sharing shown in FIGS. 2-5 can only be used for outgoing calls, and cannot be used for incoming calls. The apparatus and method of the preferred embodiments has been developed to overcome these limitations.

Figure 6:
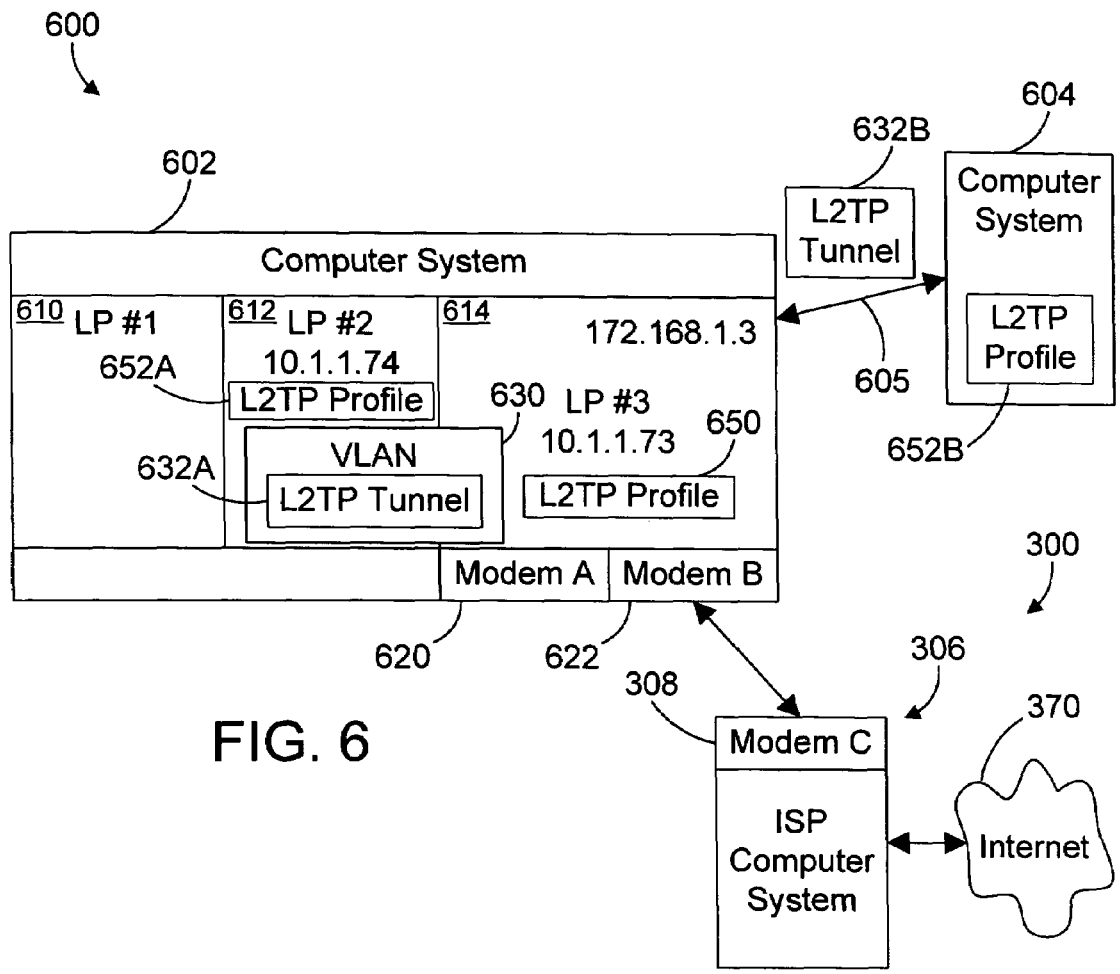
FIG. 6 is a block diagram of a networked computer system in accordance with the preferred embodiments that allows the sharing of a resource such as a modem between logical partitions and between computer systems.

Referring now to FIG. 6, a system 600 in accordance with the preferred embodiments includes three computer systems 602, 604 and 306, similar in some respects to the prior art configuration shown in FIG. 3. Computer system 602 includes three logical partitions 610, 612 and 614. The logical partitions 612 and 614 communicate with each other via a VLAN 630. We assume for this example that modem 622 is to be shared. Two different clients are shown in FIG. 6, namely logical partition 612 and computer system 604. The preferred embodiments use layer two tunneling protocol (L2TP) tunnels to share a modem between logical partitions or between physical computer systems. This requires that the modem server 614 run an L2TP profile 650, and that the clients 612 and 604 run corresponding L2TP profiles 652A and 652B, respectively. To share modem 622, an L2TP tunnel is constructed between clients (604 and 612) and the modem server (logical partition 614). An L2TP tunnel 632A is thus built over the VLAN 630, while an L2TP tunnel 632B is built over a network connection 605 that connects computer system 602 to computer system 604. Once the system 600 is properly configured, each client 604 and 612 may share the modem 622 for both outgoing and incoming calls. This is one significant advantage of the preferred embodiments over the prior art, that a shared modem may be used to receive an incoming call. In the prior art, the L2TP protocol includes messages to receive incoming data, but these messages alone do not allow configuring a modem to answer a phone for incoming calls.

The L2TP tunnel is described in detail in a document known as RFC2661, which is available at http://www.faqs.org/rfcs/rfc2661.html, which is incorporated herein by reference. This document describes in detail the L2TP protocol for establishing a tunnel and communicating via the tunnel.

Figure 7:
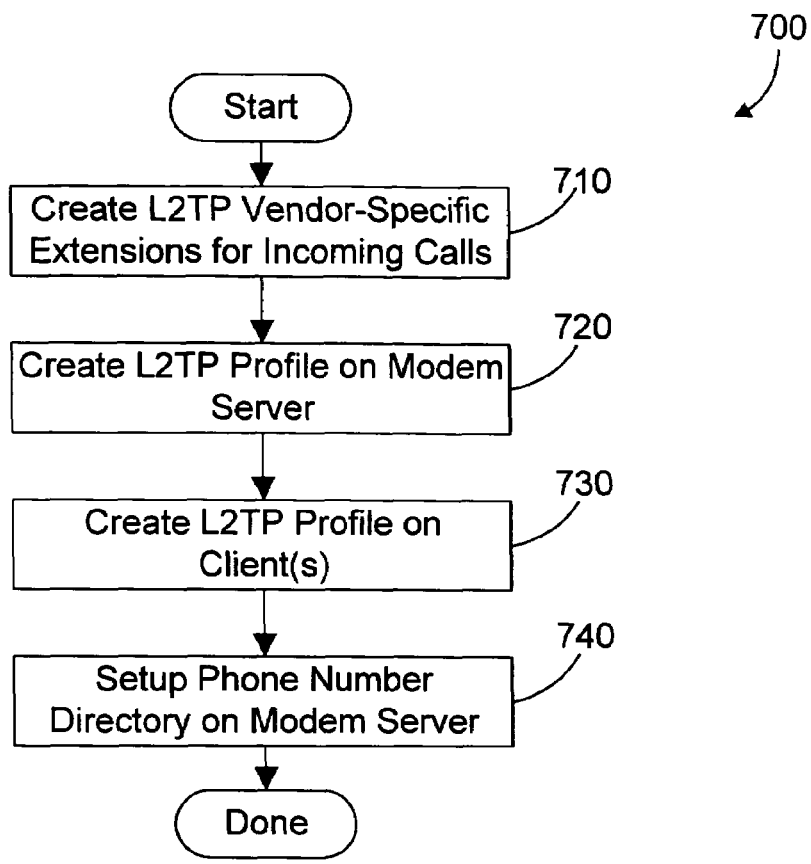
FIG. 7 is a flow diagram of a method in accordance with the preferred embodiments for configuring a modem server and one or more modem clients to share a modem in the computer system of FIG. 6.

FIGS. 7-10 show methods in accordance with the preferred embodiments. Method 700 in FIG. 7 shows steps to configure a system to share a resource. For example, method 700 could be used to configure the system 600 in FIG. 6 to share a modem. First, certain L2TP vendor-specific extensions are defined for an incoming call (step 710). This step is significant, because the native L2TP does not support configuring a modem to receive an incoming call. For this reason, vendor-specific (i.e., user-defined) extensions are provided that support receiving an incoming call by a modem. Next, an L2TP profile is created on the modem server (step 720). The L2TP profile on the modem server includes any information needed by the L2TP protocol, such as: identifying resources (such as modems) that are available for sharing; identifying one or more modems for incoming calls; identifying one or more modems for outgoing calls; specifying which interface may be used to accept these calls (i.e., accept over VLAN but not over public network); etc.

Once the L2TP profile is created on the modem server in step 720, an L2TP profile is then created on each client (step 730). A phone number directory is also setup on the modem server (step 740). In the preferred embodiments, the phone number directory may be setup as part of the L2TP profile for the modem server that is created in step 720. This phone number directory may include frequently-called numbers. By providing a phone number directory in the modem server, clients may dial a number by specifying a text string such as "PRIMARY_ISP" rather than explicitly specifying the number. When the modem server receives this text string, it sees if there is a corresponding entry in the phone number directory for that text string, and if so, it dials the corresponding phone number. In this manner the phone directory allows phone numbers to be maintained in a single directory that may be used by many modem clients, thereby simplifying system maintenance when a phone number needs to be changed, added to or deleted from the directory. Note that use of a phone number directory is optional in the preferred embodiments, so step 740 in method 700 need not be performed if a phone number directory is not used. If a phone number directory is not used, each client will preferably provide their own phone number. The preferred embodiments thus allow clients to specify a phone number for an outgoing call without requiring any reconfiguration of the modem server.

Figure 8:
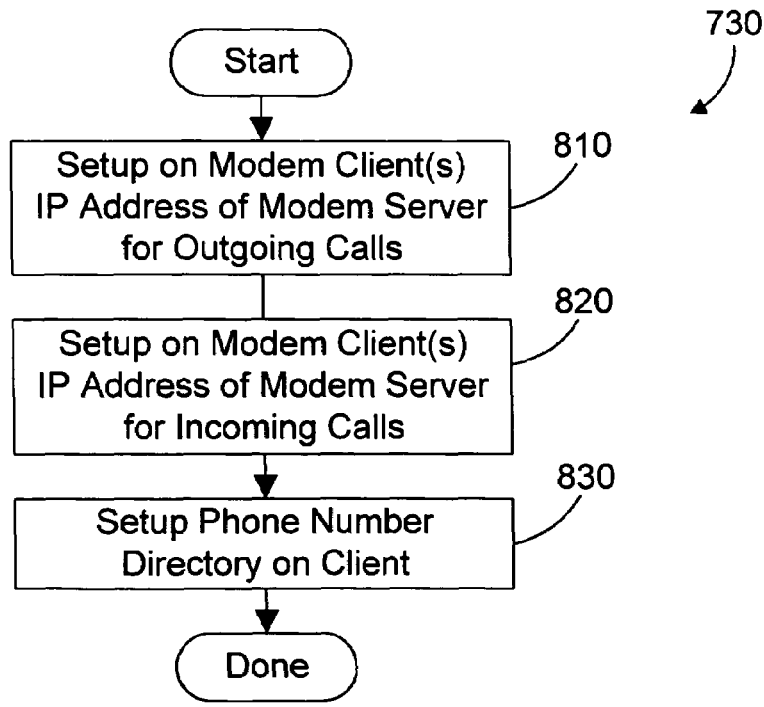
FIG. 8 is a flow diagram showing details of step 730 in FIG. 7 in accordance with the preferred embodiments.

Referring now to FIG. 8, a method 800 in accordance with the preferred embodiments shows steps that may be performed when creating the L2TP profile on the clients, shown as step 730 in FIG. 7. First, the IP address of the modem server is configured as the appropriate address for outgoing calls (step 810). Next, the IP address of the modem server is configured as the appropriate address for incoming calls (step 820). Note that steps 810 and 820 could be combined and performed in a single step. In addition, a phone number directory may be defined that uses the text strings in the phone number directory on the modem server, and that may additionally list any other phone numbers as well (step 830). Assuming steps 810 and 820 are distinct, it is possible to use a first modem server for incoming calls, and to use a second modem server for outgoing calls. In the simple example configuration in FIG. 6, the logical partition 614 is the modem server for both incoming and outgoing calls, so its IP address of 10.1.1.73 is setup in the L2TP profile of the clients as the IP address corresponding to both outgoing and incoming calls. As stated above, the use of a phone number directory is optional, so step 830 would not be performed if a phone number directory is not used.

Note that the L2TP profile created in step 720 of FIG. 7 is preferably active whenever TCP is active. As a result, anytime TCP is active, a tunnel may be established in accordance with the running L2TP profiles on the clients.

Figure 9:
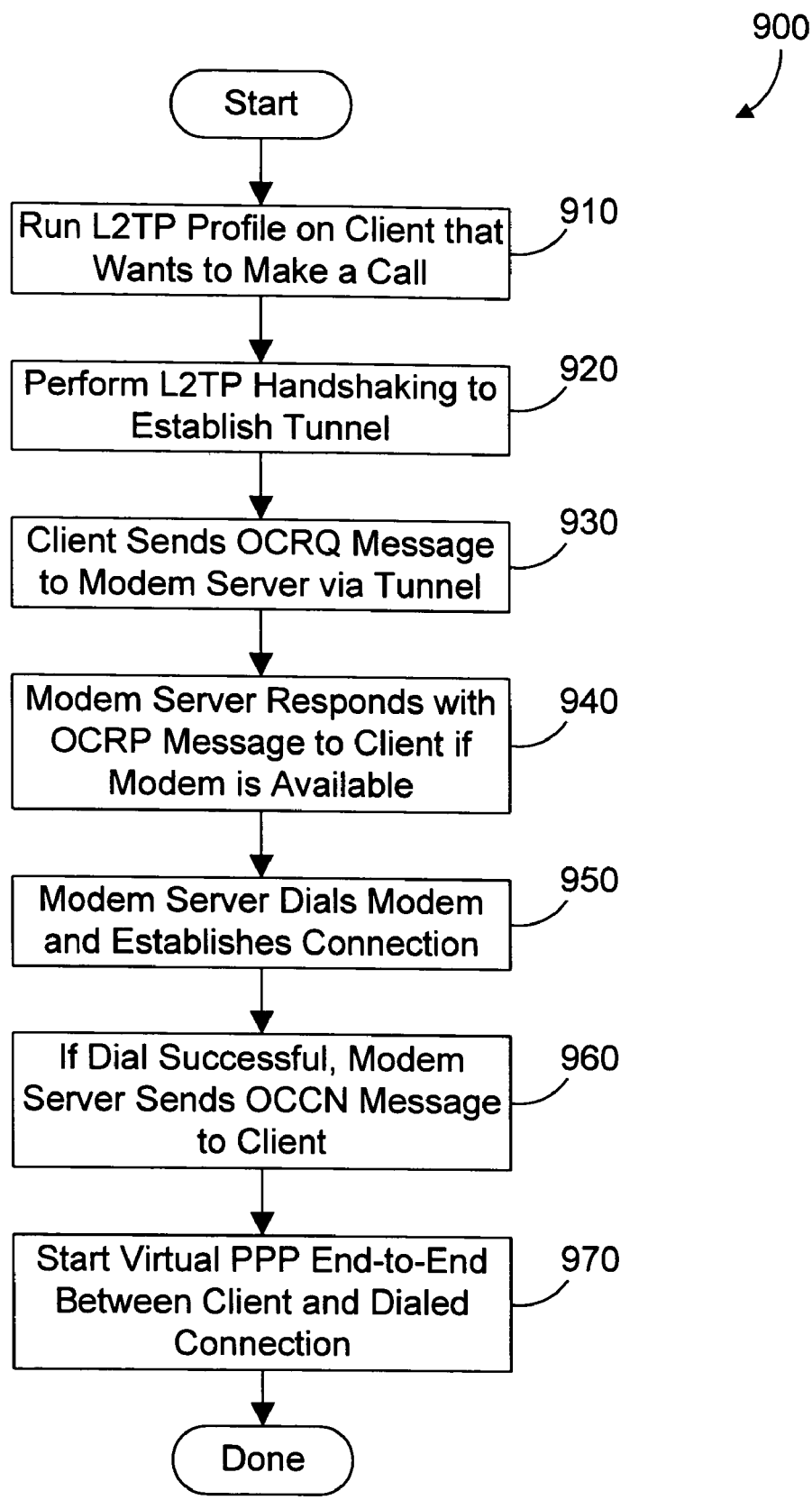
FIG. 9 is a flow diagram of a method in accordance with the preferred embodiments for making an outgoing call via the shared modem in the computer system shown in FIG. 6.

Referring now to FIG. 9, a method 900 represents steps performed when an outgoing call needs to be made by a client using the shared modem. Method 900 assumes the L2TP profile is already running on the modem server 614 in FIG. 6. Let's assume that client 612 in FIG. 6 wants to make an outgoing call using the shared modem 622. The L2TP profile 652A on the client 612 is run (step 910). Handshaking is then performed in accordance with the L2TP protocol to establish the L2TP tunnel 632A over VLAN 630 between the client 612 and the modem server 614 (step 920). The client then sends an OCRQ message, which is an outgoing call request, to the modem server via the tunnel (step 930). This OCRQ message may include a text string that corresponds to a phone number in the modem server's phone number directory, or may specify an explicit telephone number. The modem server responds with an OCRP message, which is an outgoing call reply, if a shared modem is available to make the call (step 940). We assume for this example that modem 622 in FIG. 6 is available. The modem server then dials the phone number specified in the OCRQ message, and establishes a connection with the computer system on the other end (step 950). If the dial and connection are successful, the modem server sends an OCCN message to the client, which is an outgoing call connect, to indicate that the call has been successfully connected (step 960). At this point virtual point-to-point communication between the client and the dialed connection are made (step 970). Method 900 illustrates several advantages of the preferred embodiments when compared to the prior art. First, the phone directory on the modem server allows the modem client to simply specify a text string that is in the phone directory instead of an explicit telephone number. This allows all client systems to be easily configured to dial the same phone number by specifying a text string such as PRIMARY_ISP. Should the phone number for the primary ISP change, or if a change is made to a different ISP, the single phone number in the directory that corresponds to the text string PRIMARY_ISP is changed on the modem server, and all clients will now access the new phone number by specifying the PRIMARY_ISP text string.

Another advantage of method 900 is that the client controls the function of the shared modem. Contrast this with the prior art system shown in FIG. 3, where the modem server controls the function of the shared modem, and the modem is shared in accordance with the static configuration information. In the prior art, if a client wants to dial a phone number that is not in the static configuration information of the modem server, the phone number must be added to the static configuration information before the call may be made. With the preferred embodiments, the L2TP tunnel provides an efficient mechanism that allows the client to dial any desired phone number using the shared modem.

Figure 10:
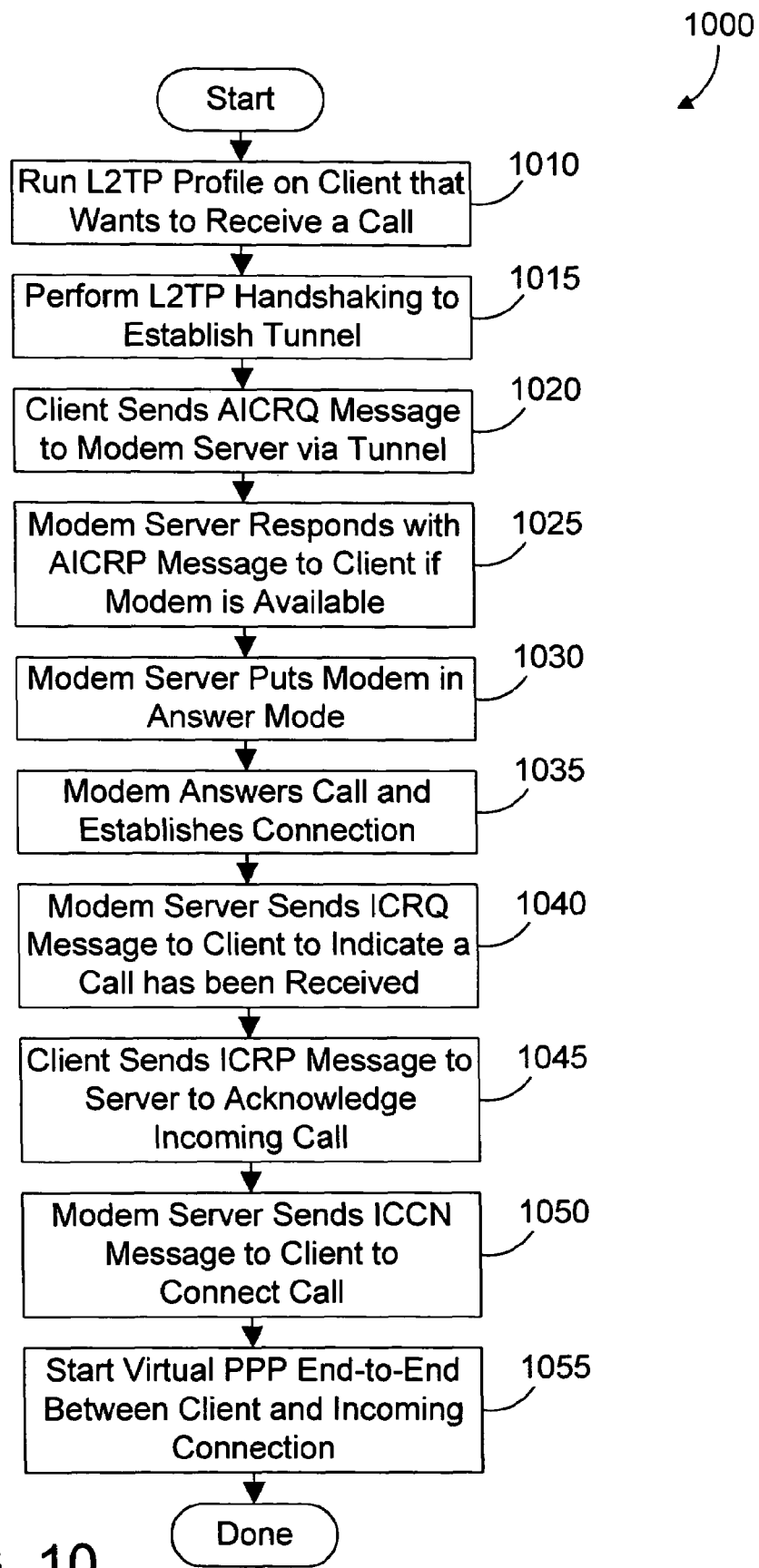
FIG. 10 is a flow diagram of a method in accordance with the preferred embodiments for receiving an incoming call via the shared modem in the computer system shown in FIG. 6.

Referring to FIG. 10, a method 1000 shows the steps performed when a client wants to receive an incoming call on a shared modem. We assume for this example that computer system 604 is the client, and that modem 622 is a shared modem. Method 1000 assumes the L2TP profile 650 is already running on the modem server 614. The L2TP profile 652B is run on the client 604 (step 1010). Next, handshaking is performed between the client and modem server to establish the L2TP tunnel 632B (step 1015). Once the tunnel 632B is established, the client 604 sends an AICRQ message to the modem server 614 via the L2TP tunnel 632B (step 1020). If a shared modem is available to receive the call, the modem server responds with an AICRP message (step 1025). The AICRQ and AICRP messages are both vendor-specific (i.e., user-defined) extensions to the L2TP protocol. AICRQ stands for "accept incoming call request", while AICRP stands for "accept incoming call reply". These special extensions that allow configuring a modem to receive a call are not known in the art, and are a significant aspect of the preferred embodiments. Once the modem server 614 sends the AICRP message in step 1025, the modem server 614 puts the modem 622 in answer mode (step 1030). The modem then answers the call and establishes a connection with the computer system on the other end (step 1035). Once the connection to the incoming call is made, standard messages in the L2TP protocol may be used to connect the client to the incoming call. Thus, the modem server 614 sends an ICRQ message (incoming call request) to the client 604 via tunnel 632B to indicate a call has been received (step 1040). In response, the client 604 sends an ICRP message (incoming call reply) to acknowledge the incoming call (step 1045). The modem server then sends an ICCN (incoming call connect) message to the client to connect the call to the client (step 1050). At this point, virtual point-to-point communications are performed end-to-end between the client and the incoming connection (step 1055).

An advantage of the preferred embodiments is that the client controls the function of the shared modem. The modem is put in answer mode when requested by the client after pre-establishing a tunnel to the system with the shared modem. The received incoming call is then routed directly through the existing tunnel back to the client. Contrast this with known ways of sharing modems for incoming calls, such as when an Internet service provider (ISP) uses a pool of modems to answer incoming calls. The modem is put in answer mode by the modem server. A static table of user IDs must be maintained on the modem server. When the incoming call is then received, a partial authentication must be done using the static table of user IDs prior to knowing where to direct the call. The call is then directed to the appropriate client. In contrast, the preferred embodiments allow receiving an incoming call without the modem server performing this partial authentication, allowing the client to control the function of the modem.

For the examples above, note that the logical partition 612 was assumed to be the client in the discussion of method 900 of FIG. 9, while physical computer system 604 was assumed to be the client in the discussion of method 1000 in FIG. 10. This shows that the preferred embodiments allow sharing a resource across logical partitions and across physical systems as well. The resource sharing mechanism of the preferred embodiments can be configured to function with either logical partition clients or physical system clients, without the resource sharing mechanism having any knowledge of which is which. This creates a very flexible system that allows modem sharing not only among logical partitions on the same computer system, but across computer systems as well.

In the specific examples shown in FIGS. 6-10, we assumed that modem 622 is the shared resource. Note, however, that the apparatus and method of the preferred embodiments apply equally to sharing other resources as well. For example, a virtual private network (VPN) using L2TP protected by IPSec could be provided as a shared resource, with connection to the VPN controlled in the same way as connection to a shared modem. One skilled in the art will appreciate that the apparatus and methods herein may be extended to any suitable shared resource. In addition, the example herein that shows sharing a modem between logical partitions is one possible configuration for sharing a shared resource in accordance with the preferred embodiments. Any operating system, logical partition, or physical device with TCP and L2TP support could share a shared resource as described herein.

The preferred embodiments provide a significant advance over the prior art by allowing efficient sharing of a resource among both logical partitions and physical computer systems. An L2TP tunnel is built between a resource server that owns (or controls) a shared resource and a client that wants to use the shared resource. A directory on the resource server allows the client to specify text string identifiers for the connection to be made. Messages defined in the L2TP protocol allow establishing an outgoing connection. User-defined extensions to the L2TP protocol define messages for requesting the acceptance of an incoming connection, and replying to the request. The methods of the preferred embodiments allow a client to control a shared resource, providing great flexibility in how the client uses the shared resource. In addition, because the point-to-point connection is end-to-end, TCP connections are allowed in both directions. Furthermore, since the tunneling of the packets is at Layer 2, the traffic is not being handled by the TCP/IP stack on the modem server. This has added security benefits because it is more difficult to intercept the network traffic flowing through the shared resource.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for sharing a shared resource between a resource server that controls the shared resource and a client, the method comprising the steps of:
    (A) establishing a layer two tunneling protocol (L2TP) tunnel between the resource server and the client;
    (B) establishing an outgoing connection from the client through the shared resource via the L2TP tunnel using a plurality of messages defined by a predefined L2TP protocol for the L2TP tunnel; and
    (C) establishing an incoming connection through the shared resource to the client via the L2TP tunnel using a plurality of messages defined by user-defined extensions to the L2TP protocol for the L2TP tunnel, wherein the plurality of messages defined by the user-defined extensions to the L2TP protocol comprise an accept incoming call request (AICRQ) message and an accept incoming call reply (AICRP) message.

2. The method of claim 1 wherein the client resides in a second logical partition that is separate from a first logical partition that includes the shared resource.

3. The method of claim 1 wherein the client comprises a computer system coupled to the resource server via a network connection.

4. The method of claim 1 wherein the shared resource comprises a modem.

5. The method of claim 1 wherein the shared resource comprises a virtual private network (VPN).

6. The method of claim 1 wherein the incoming and outgoing connections are point-to-point connections.

7. A computer-implemented method for sharing a modem between a modem server in a first logical partition that controls the modem and a client in a second logical partition, the method comprising the steps of:
    establishing a layer two tunneling protocol (L2TP) tunnel between the modem server and the client by running an L2TP profile on the client and by performing handshaking to establish the L2TP tunnel;
    the client sending an accept incoming call request (AICRQ) message that is a user-defined extension to an L2TP protocol for the L2TP tunnel;
    if the modem is available, the modem server responding to the AICRQ message with an accept incoming call reply (AICRP) message that is a user-defined extension to the L2TP protocol for the L2TP tunnel;
    the modem server putting the modem in answer mode;
    the modem answering a call and establishing a connection;
    the modem server sending an incoming call request (ICRQ) message that is defined in the L2TP protocol to the client to indicate a call has been received;
    the client sending an incoming call reply (ICRP) message that is defined in the L2TP protocol to the modem server to acknowledge the incoming call;
    the modem server sending an incoming call connect (ICCN) message to the client to connect the call; and
    starting virtual point-to-point end-to-end communication between the client and the modem.

* * * * *